Feb. 9, 1943.  W. P. ADAMS  2,310,826
HOB
Filed May 6, 1939
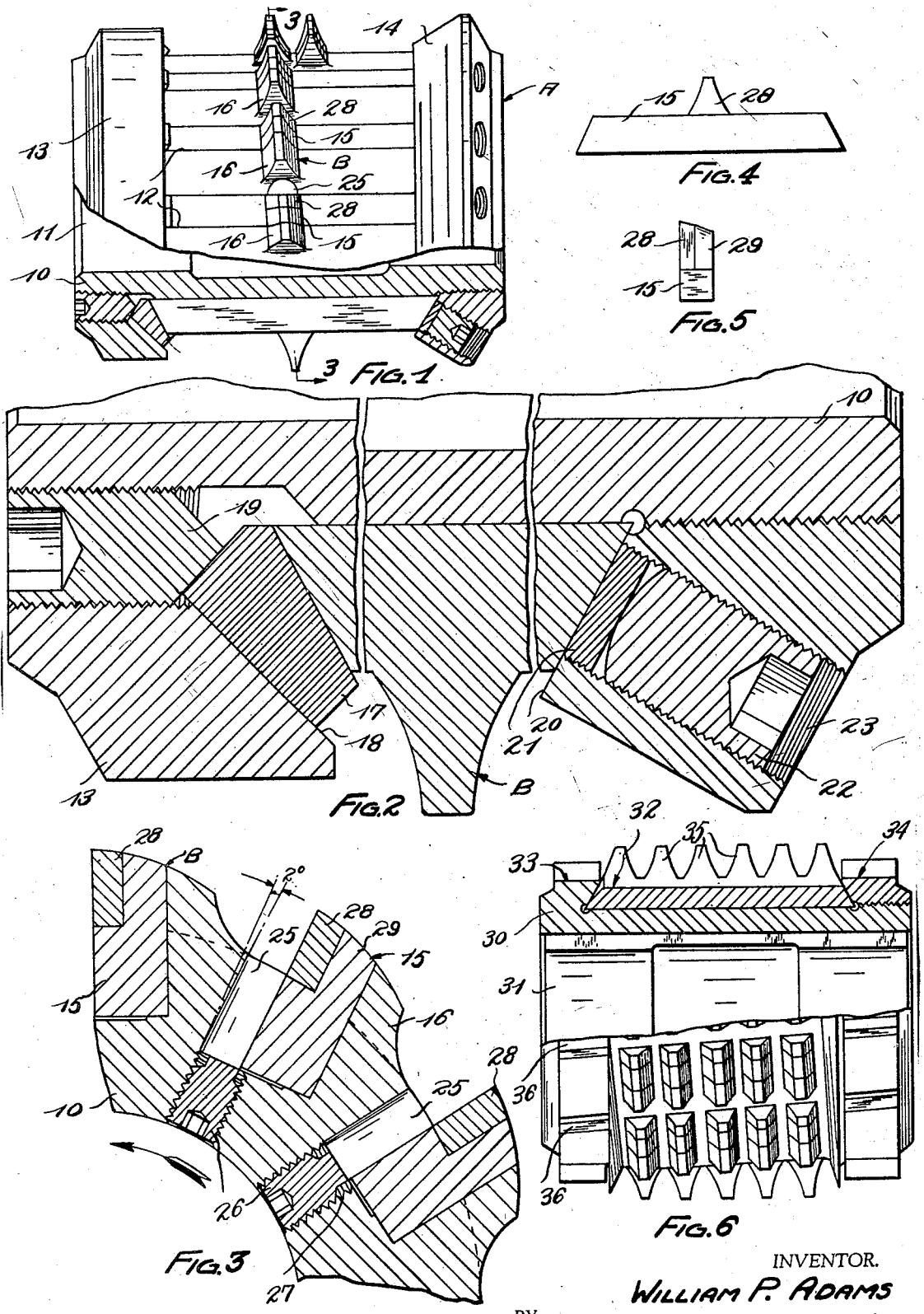
INVENTOR.
WILLIAM P. ADAMS
BY
Kwis Hudson & Kent
ATTORNEYS Patented Feb. 9, 1943

2,310,826

UNITED STATES PATENT OFFICE 2,310,826

HOB

William P. Adams, Cleveland Heights, Ohio

Application May 6, 1939, Serial No. 272,191

10 Claims. (Cl. 29—105)

The present invention relates to cutting tools and more particularly to hobs used in cutting gear teeth, splined shafts, etc.

An object of the present invention is the provision of a novel and improved hob for cutting gears, splined shafts, etc., having insertible teeth which can be ground to form before assembly with the body of the cutter.

Another object of the present invention is the provision of a novel and improved hob for cutting gears, splined shafts, etc., the cutting surfaces of the teeth of which are formed of a high speed cutting material, preferably of the sintered carbide type, such as, Carboloy, Stellite, Firthite, etc.

Another object of the present invention is the provision of a novel and improved insertible tooth for an insertible tooth hob, the cutting edge of which tooth comprises a high speed cutting material, such as, Carboloy, Stellite, Firthite, etc.

The present invention resides in certain details of constructions and combinations and arrangements of parts and further objects and advantages of the invention will be apparent to those skilled in the art to which the invention relates from the following decription of the preferred embodiments thereof described with reference to the accompanying drawing forming a part of this specification, in which similar reference characters designate corresponding parts and in which:

Fig. 1 is a front elevational view of a hob embodying the present invention, with portions shown in section, on the center line of the hob and other portions broken away.

Fig. 2 is an enlarged view of a portion of Fig. 1.

Fig. 3 is a sectional view approximately on the line 3—3 of Fig. 1.

Fig. 4 is a side elevational view of one of the tooth members shown in the preceding figures.

Fig. 5 is an end elevational view of the tooth member shown in Fig. 4, and

Fig. 6 is a front elevational view of a hob of modified construction with portions shown in section on the center line.

Referring to the drawing, Figs. 1 to 5, inclusive, show a single convolution hob, designated generally by the reference character A, and provided with form relieved teeth B, that is, teeth which can be sharpened by merely grinding away the front face thereof without changing their form. The hob shown comprises a spool-like body member 10 having a central bore therethrough and a plurality of longitudinally extending grooves 12 opening into the exterior surface thereof between the end portions 13 and 14.

In operation, the hob A is rotated in the direction indicated by the arrow in Fig. 3 and the forward or leading ends of the cutting teeth, designated generally by the reference character B, are formed on insertible toothed members 15 detachably secured within the grooves 12 of the body member 10. As shown, only the forward or leading portions of the teeth are on the insertible members and the portions 16 of the teeth proper, which portions are formed integral with the body 10, back up the insertible portions of the teeth. If desired, teeth may be formed entirely on the insertible members.

The members 15 preferably have a driving fit in the grooves 12 and upon being positioned therein are fixedly secured in place by a number of wedge members. As clearly shown in Fig. 2, the left-hand end of each tooth member 15 is tapered radially outwardly and is forced in a direction to engage the bottom of the grooves 12 by a wedge member 17 interposed therebetween and an undercut annular surface 18 on the end portion 13 of the body 10. The wedge members 17 are adapted to be moved along the undercut surface 17 by set screws 19 threaded in suitable apertures formed in the body 10 and having means for the reception of a suitable tool for rotating the same.

The right-hand ends of the tooth members 15 are tapered similar to the left-hand end thereof and project underneath an undercut annular surface 20 formed on the right-hand end portion 14 of the body 10. The inclined surfaces on the right-hand ends of the tooth members 15 are adapted to be engaged by members 21 interposed therebetween and adjustable screws 22 threaded into suitable tapped apertures 23 formed in the right-hand end portion 14 of the body 10.

The teeth are ground to form prior to assembly with the body and in order to facilitate assembly, adjustment, etc., the right-hand end member 14 of the body member 10 is made in the form of a separate ring threaded onto the body portion proper. However, it is to be understood that these parts may be made integral if desired. In the embodiment of the invention shown, the means just described for securing the tooth members 15 in assembled relation with the body 10 is supplemented by a plurality of tapered, semi-cylindrical wedge members 25 positioned in suitable apertures formed in the body 10 directly in front of the tooth proper and engaging the forward surface of the insertible tooth members 15. The construction is such that as the wedge members 25 are moved radially outward, they securely wedge the tooth members 15 in the grooves 12 and force those parts of the teeth proper which are formed on the members 15 into firm engagement with the trailing ends of the teeth, which trailing ends are formed integral with the body 10 and back up the forward parts of the teeth. The wedge members 25 are adapted to be moved radially outwardly to wedge the insertible tooth members 15 securely in position by screws 26 threaded into suitable tapped apertures 27 in the body 10 directly underneath the wedge members 25. The screws 26 are provided with means for the reception of a driving tool and are accessible through the central bore 11 of the hob.

The forward or cutting ends of the teeth B are formed of an extremely hard, high speed cutting material, preferably a metallic sintered carbide, such as, tungsten carbide. A number of suitable compounds are available on the market under trade names, such as, Carboloy, Stellite and Firthite. Preferably, the high speed cutting material is made in the form of bits 28 braised or otherwise suitably secured to the tooth portions 29 of the members 15. Cutting compositions of the character referred to are so hard that they can be ground only with difficulty but with the hob of the present invention, the tooth form can be ground on the members 15 prior to assembly with the body 10.

The invention is not limited to a single convolution hob or to the particular construction shown in Fig. 1 but is applicable to any type of hob and any suitable means may be employed for retaining the insertible teeth in position. Fig. 6 shows a multiple convolution hob embodying the present invention and comprising a body member 30 having a central bore 31 therein and a plurality of detachable tooth members 32 secured in suitable grooves formed in the body member 30 similar to the grooves 12 shown in Fig. 1 and retained therein by tapered ends which engage underneath undercut grooves formed in the end portions 33 and 34 of the body member, the latter of which has a threaded engagement with the body member proper. The teeth 35 of the hob shown in Fig. 6 have bits 28 formed of extremely hard, high speed cutting material braised thereto. The body portion 30 is also provided with a plurality of grooves 36 in the end portions thereof so that a grinding wheel can be moved straight across in sharpening the cutter. This idea is also applicable to the hob shown in Fig. 1.

While the preferred embodiment of the invention has been described with considerable detail, I do not wish to be limited to the particular construction shown, which may be varied within the scope of the invention and it is my intention to cover hereby all adaptations, modifications and uses thereof which come within the practice of those skilled in the art to which the invention relates, and I particularly point out and claim as my invention the following:

1. An insertible blade hob comprising a cylindrical-like body member having a plurality of longitudinally extending external grooves therein, blade members having hob teeth thereon positioned in said grooves, means for individually adjusting said blade members longitudinally of said body member, and means for securing said blade members in said grooves.

2. An insertible blade hob comprising a cylindrical-like body member having a plurality of longitudinally extending grooves therein, blade members having form relieved hob teeth thereon positioned in said grooves, said teeth having cutting bits or surfaces thereon formed of high speed cutting material, means for individually adjusting said blade members longitudinally of said body member, and means for securing said blade members in said grooves.

3. An insertible tooth cutter comprising a cylindrical-like body member having a central bore and a plurality of longitudinally extending external grooves, removable blade members positioned in said grooves, locking members located in front of said blade members and positioned between said blade members and said body member, and means accessible through the center bore of said body portion and engaging underneath said locking members for moving said locking members to secure said blade members in said body member.

4. An insertible tooth cutter comprising a cylindrical-like body member having a central bore and a plurality of longitudinally extending external grooves, removable blade members positioned in said grooves, wedge members located in front of said blade members and positioned between said blade members and said body member, and means for moving said wedge members radially to secure said blade members in said body member, said last-mentioned means comprising screws having threaded engagement with said body member and accessible through the central bore of the body member.

5. An insertible tooth cutter comprising a cylindrical-like body member having longitudinally extending external grooves, blade removable members positioned in said grooves, wedge members located between the ends of said blade members and said body member, and means for adjusting said wedge members individually.

6. An insertible blade for a hob, said blade comprising an elongated rectangular body portion adapted to be inserted into a longitudinally extending external groove in a cylindrically-shaped supporting member and adjusted lengthwise therein, said body portion having a form relieved hob tooth thereon and a uniform surface on a portion of the forward side thereof adapted to be engaged by a locking member, said tooth having the front portion only thereof formed of a high speed cutting material such as a sintered carbide or the like, and said uniform surface on a portion of the forward side of said body portion permitting lengthwise adjustment of said blade relative to the locking member.

7. An insertible blade hob comprising a cylindrical-like body member having a central bore and a plurality of longitudinally extending external grooves, removable blade members having a body portion positioned in said grooves, said body portion having a form relieved hob tooth projecting therefrom the cutting edge of which is formed of high speed cutting material, locking members positioned in front of said blade members and located between said blade members and said body member, and means accessible through the central bore of said body member and engaging underneath said locking members for moving said locking members radially to secure said blade members in said body member.

8. An insertible blade hob comprising a cylindrical-like body member having a central bore and a plurality of longitudinally extending external grooves, removable blade members having body portions positioned in said grooves and adjustable longitudinally therein, each of said body portions having a form relieved hob tooth projecting therefrom the front portion only of which is formed of high speed cutting material, locking members positioned in front of said blade members and located between said blade members and said body member, and means for moving said locking members to secure said blade members in said body member.

9. An insertable blade hob comprising a cylindrical-like body member having a central bore and a plurality of longitudinally extending grooves, removable blade members having body portions positioned in said grooves and adjustable longitudinally therein, said body portions having a form relieved hob tooth projecting therefrom the front portion alone of which is formed of high speed cutting material, locking members positioned in front of said blade members and located between said blade members and said body member, means for individually adjusting said insertable blades lengthwise of said body member, and means for moving said locking members to secure said insertable blades in said body member.

10. An insertable blade hob comprising a cylindrical-like body member having a central bore and a plurality of longitudinally extending grooves, removable blade members having body portions positioned in said grooves and adjustable longitudinally therein, said body portions having a form relieved hob tooth projecting therefrom the front portion of which is formed of high speed cutting material, locking members positioned in front of said blade members and located between said blade members and said body member, means for individually adjusting said insertable blades lengthwise of said body member, and means for moving said locking members to secure said insertable blades in said body member, said last-mentioned means comprising screws threaded into suitable apertures in said body member and accessible through the central bore thereof.

WILLIAM P. ADAMS.